June 12, 1962  R. G. GILLILAND ETAL  3,038,249
ZIRCONIUM-TITANIUM-BERYLLIUM BRAZING ALLOY
Filed Dec. 15, 1960
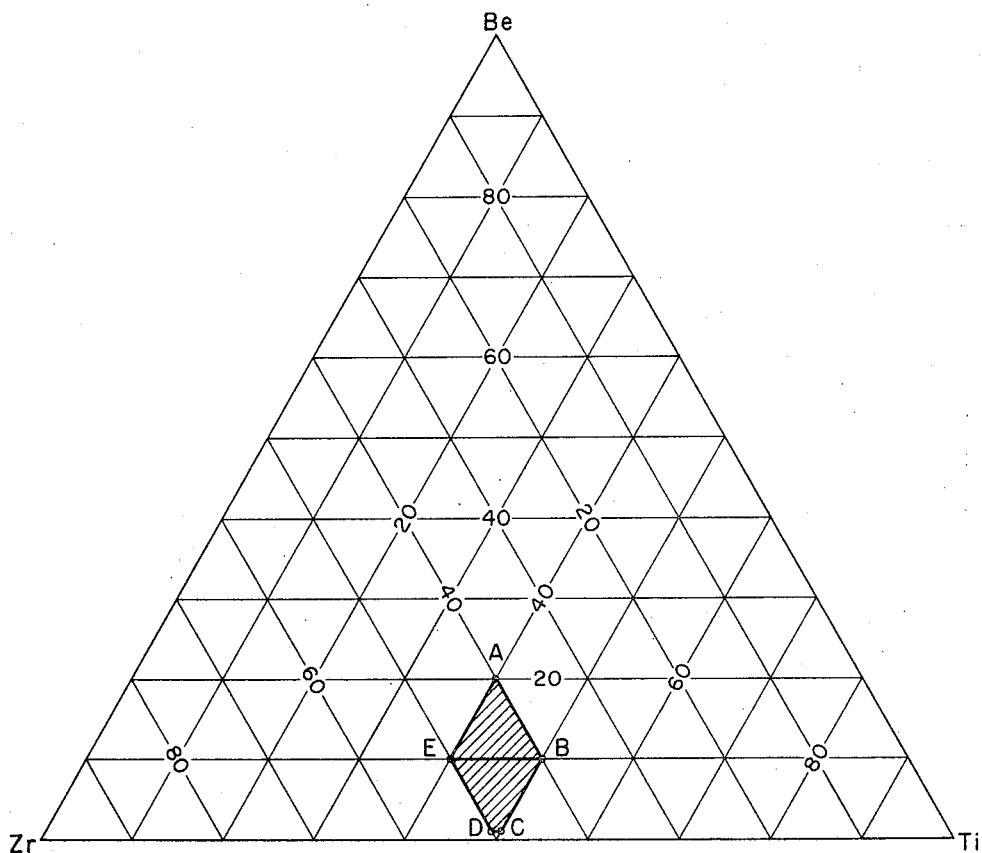
INVENTORS.
Ralph G. Gilliland
Peter Patriarca
Gerald M. Slaughter
Leonard C. Williams
BY
ATTORNEY 3,038,249
ZIRCONIUM-TITANIUM-BERYLLIUM
BRAZING ALLOY
Ralph G. Gilliland, Oak Ridge, Peter Patriarca, Knoxville, Gerald M. Slaughter, Oak Ridge, and Leonard C. Williams, Clinton, Tenn., assignors to the United States of America as represented by the United States Atomic Energy Commission
Filed Dec. 15, 1960, Ser. No. 76,084
4 Claims. (Cl. 29—494)

The present invention relates to the art of brazing metal parts which are subjected to high temperatures of the order of about 600° C. to about 1000° C. and to highly corrosive atmospheres. More particularly, it relates to a brazing alloy for joining such refractory metals as titanium, columbium, zirconium, molybdenum, and tantalum and alloys containing these metals as predominant alloying ingredients and other materials which are extremely difficult to wet.

The commercial advent of nuclear power requires structural materials capable of operation at elevated temperatures under corrosive atmospheres and in an intense radioactive field. The refractory metals, particularly of the group IV, V and VI of the periodic table and alloys thereof, have shown particular promise as materials of construction, especially in nuclear reactor fuel elements, reactor coolant systems and associated piping, and other supporting reactor components. The advantageous properties of these metals include: relatively low cross section to thermal neutrons, excellent corrosion resistance in various corrosive media, high melting point and good mechanical properties at elevated service temperatures. One of the principal problems associated with the use of such metals in nuclear power reactors is the dearth of information concerning base filler materials which have the requisite combination of properties for successful use in the fabrication and joining of structures made of such metals and alloys thereof.

The basic properties required in a braze filler alloy material are that it should melt at a convenient temperature, that it should melt and flow freely on the surface of the material to be brazed at or near the melting temperature of the alloy. In this connection, nuclear considerations can dictate, to an appreciable extent, the selection of a braze filler material. Those metals or alloys which would give a sound joint in all respects except that they have a high cross section for thermal neutrons cannot, in most instances, be considered suitable.

The limits of the braze alloy melting point are determined on the high side by the requirement that the braze material must melt at a temperature appreciably below the melting point of the base material and below the temperature where deleterious alloying and other effects are encountered. As an example, when certain nickel alloys are used as a braze filler material for joining molybdenum, diffusion of the nickel produces a nickel-molybdenum intermetallic alloy with a lower ductility than the base material. It is obvious that the result change of properties can seriously affect the usefulness of the resultant brazed assembly.

The limits of the braze alloy melting point are determined on the low side by the need for the formation of sufficient alloying between the filler alloy and the work base material to give a bond which is satisfactorily strong under the service conditions under which the brazed joint will operate.

In addition to the requirements mentioned, a brazing alloy must have satisfactory strength at high temperatures and must be corrosion resistant at these temperatures. In particular, there should not be any accelerated corrosion caused by the presence of a bimetallic system; nor should there be any significant corrosion caused by mass transfer effects in liquid metal or pressurized water systems. The thermal expansion coefficient and thermal conductivity, volatility of braze components, reactivity of braze components are other important variables which will govern the selection of a suitable braze filler material in a given instance.

Although numerous attempts have been made to meet the foregoing requirements, none, as far as we are aware, have been successful in providing, in a single braze alloy system, one which meets all of these requirements so that it will be suitable for use in the fabrication of structures designed to operate at high temperatures in contact with highly corrosive medium and within a neutron flux such as is found in a power-producing nuclear reactor.

It is an object of this invention to provide a new and improved brazing alloy characterized by improved corrosion resistance at elevated temperatures, said alloy having excellent wetting and flowing properties and having a melting point in the approximate range 1000° to 1400° C. A further object of this invention is to provide a new and improved brazing alloy of particular utility in forming corrosion-resistant joints with the refractory metals of group IV, V, and VI of the periodic table. A further object of this invention is to provide a fabricated assembly comprised of a plurality of members wherein at least one of said members is a metal selected from the group consisting of titanium, molybdenum, zirconium, hafnium, tantalum, columbium and alloys containing said metal as a predominant alloying ingredient.

Another object of this invention is to provide a self-fluxing brazing alloy which meets all of the requirements hereinbefore mentioned, and which is further characterized by the ability to wet and flow freely on materials having a tenacious and stable oxide surface layer.

Other objects and advantages will become apparent from the following description taken in conjunction with the accompanying drawing, which is a graph, on triangular coordinates, defining the composition of the brazing alloys within the scope of the invention.

The present invention comprises an improved ternary alloy of zirconium, titanium and beryllium and an improved process of uniting parts or members of the refractory metals with said brazing alloys, the melting point of said alloy being at least 950° C., but not exceeding above about 1400° C. It has been found that by controlling the composition of the zirconium-titanium-beryllium alloy over the range 40 to 50 percent zirconium, 40 to 50 percent titanium, and the balance beryllium in amounts ranging from 1 to 20 percent, by weight, a brazing alloy is obtained having the requisite melting range to enable its use in uniting refractory metals and alloys thereof at temperatures which do not adversely affect the material to be joined. The brazing alloy is characterized by high corrosion resistance, improved wetting and flow properties when in contact with non-metallic and metallic materials such as graphite and alumina which are difficult to wet even at elevated joining temperatures, e.g., at brazing temperatures of the order of about 1000° C. or more. The brazing alloys which are useful in forming corrosion-resistant joints are defined in the area bounded by A—B—C—D—E of the figure. It is to be appreciated that small amounts of other metals may also be present without seriously affecting the properties of the alloy or that of the resultant joint produced thereby.

These alloys are very strong and corrosion resistant in addition to having excellent wetting and flow properties. As an example of its corrosion resistance, an alloy containing 48 percent zirconium, 48 percent titanium, and 4 percent beryllium was immersed in liquid lithium at a temperature of 1500° F. for a period of 500 hours. The resultant alloy was examined and was found to have undergone substantially no change except for a loss in weight of less than about 0.03 percent. In another case, a brazed assembly of Zircalloy parts (having the average composition, by weight, Sn 1.4%, Fe .12%, Cr .10%, Ni .06% and the remainder Zr) brazed with the same brazing alloy was exposed to pressurized water (1200 p.s.i.) at a temperature of about 300° C. for a period of 91 days without experiencing any deleterious effects.

While all of the alloy compositions within area A—B—C—D—E may be used with advantage, the preferred alloys fall within the area B—C—D—E. The alloy compositions falling within this area have a melting point between 950° C. and 1250° C. The advantage obtained by the use of these alloys is that their tendency to form brittle intermetallic compounds is very low and they can be worked into suitable shapes without too much difficulty. While still useful, alloys of this invention containing greater than about 10 percent beryllium have a higher melting point which may be deleterious in certain instances. In addition, they are somewhat more difficult to work as a result of an increased tendency to form brittle intermetallic compounds. Attempts to use ternary zirconium-titanium-beryllium alloys outside of the indicated areas encounter serious difficulties and disadvantages. For example, alloys containing greater than about 50 percent, by weight, zirconium or titanium are disadvantageous because of the excessively high melting point of the resultant alloy.

An outstanding advantage of the alloys within the scope of this invention is that they are self-fluxing in character. Apparently these alloys have the ability to destroy the tenacious and stable oxide film frequently found on the surface of the reactive refractory metals, particularly zirconium, titanium, molybdenum, niobium and tantalum. Thus joining may be effected without the use of a fluxing material in vacuum or in an inert atmosphere.

In forming a joint between these metals, the clearance between the parts is not critical; not only do the alloys flow well through capillary openings, but they will also fill larger openings while still providing joints having satisfactory mechanical strength and corrosion resistance. Accordingly, it is not necessary, although it may still be desirable in certain instances, to prepare the surfaces to be joined so that they mate with one another exactly.

Prior to brazing, all parts should have clean surfaces free of dirt or oil or grease. One satisfactory cleaning procedure is wire brushing the joint area followed by an acetone and ethyl alcohol scrubbing. The brazing alloy is prepared by weighing out the required ingredients, preferably in powder or finely divided form and then arc melting the resultant mixture in an inert atmosphere, such as argon. The resultant alloy button or ingot is then subdivided into small particles no greater than about 50 mesh size and may be used in this manner. A preferred method of application involves the use of a carrier which will form a slurry with the braze material. The carrier must also be capable of volatilizing during the brazing cycle without leaving harmful or contaminating deposits. Carriers of this type are available commercially as, for example, a nitrocellulose binder. Brazing alloys containing no more than about 6 percent beryllium may be hot formed at an approximate temperature range of 600 to 800° C. to form foil or wire in cases where the use of a braze filler in these forms is desirable.

After cleaning, the component parts to be joined may be mounted in a brazing fixture or an assembly fixture, or both, depending on the complexity of design of the finally desired brazed assembly. The filler braze alloy is positioned at the desired areas to be joined and heated to the required brazing temperature in an inert atmosphere. The heating cycle should be gradual and the heating means designed in such a manner as to maintain uniform and constant temperature. The brazing temperature will depend on the particular brazing alloy used, but in most cases, should be about 50–100° C. above the melting point to permit free flowability. The optimum time and temperature of brazing will depend upon size and thickness of parts to be brazed. If held too long in the brazing range excessive base metal alloying will occur; if held too short at the brazing temperature, inadequate flow and incomplete filleting will result.

The high brazing temperatures required for the brazing alloys of this invention may be achieved by the use of a radio-frequency induction heater apparatus or a resistance heated, vacuum muffle furnace. The entire brazing operation must be conducted in vacuum or under an inert atmosphere because of the oxidizing nature of both the brazing alloy and the base metal. In certain cases, it may be desirable to preheat the unjoined assembly in order to minimize uneven increases in temperature and to prevent any warpage or distortional effects which may occur during brazing. Table I lists the approximate (to within ±25° C.) melting point of several representative brazing alloys within the scope of the invention.

TABLE I

| Composition: | Approximate melting point ° C. |
|---|---|
| 49Ti–50Zr–1Be | 1250 |
| 48Ti–50Zr–2Be | 1250 |
| 48Ti–49Zr–3Be | 1100 |
| 48Ti–48Zr–4Be | 1000 |
| 47Ti–48Zr–5Be | 950 |
| 47Ti–47Zr–6Be | 950 |
| 45Ti–45Zr–10Be | 1000 |
| 43Ti–43Zr–14Be | >1300 |
| 40Ti–40Zr–20Be | >1300 |

An example of an alloy that can be used with advantage to form a brazed joint is one containing 48 percent zirconium, 48 percent titanium, and 4 percent beryllium. Using this alloy, a T-joint was formed between a columbium and a molybdenum article. The brazed T-joint was then exposed to a total neutron flux of $6 \times 10^{12}$ neutrons/cm.$^2$/sec. at a temperature of 1000° F. for a period of one month, and at the end of this time was found to still be operating satisfactorily in terms of strength and corrosion resistance. As an example of the remarkable strength and ductility of the brazing alloys of this invention, several Cb—Cb, Ta—Ta, Ti—Ti and Zr—Zr-brazed T-joints were formed utilizing the exemplary alloy mentioned above. In each case a force was exerted on the vertical member of the T-joint sufficient to bring it parallel with the horizontal member of the joint. In each case the force applied was insufficient to form any deleterious cracks in the brazed area, i.e., the T-joint could be completely flattened without joint failure.

It will thus be seen that the present invention provides a novel braze alloy and a method for the production of fabricated braze-bonded assemblies using said alloy to join parts made of the reactive refractory metals of group IV, V and VI of the periodic table. In addition, the brazing alloy of this invention is also suitable for forming joints between other metals and compounds thereof and non-metals.

Having described our invention, the method of using it, together with several particular embodiments thereof, it will be understood that the scope of the invention is not to be limited except as defined by the following claims.

We claim:
1. A new and improved ternary alloy of particular utility in braze bonding parts made of a refractory metal selected from group IV, V, and VI of the periodic table and alloys containing said metal as a predominating alloying ingredient, said brazing alloy consisting essentially of, by weight, 40–50 percent zirconium, 40–50 percent titanium, and the balance beryllium in amounts ranging from 1–20 percent, said alloy having a melting point in the range 950 to about 1400° C., and being further identi- fied by the area A—B—C—D—E of the accompanying drawing.

2. A new and improved ternary alloy of particular utility in braze bonding parts made of a refractory metal selected from group IV, V, and VI of the periodic table and alloys containing said metal as a predominating alloying ingredient, said brazing alloy consisting essentially of, by weight, 40–50 percent zirconium, 40–50 percent titanium, and the balance beryllium in amounts ranging from 1–10 percent, said alloy having a melting point in the range 950 to 1250° C., and being further identified by the area B—C—D—E of the accompanying drawing.

3. In a process for braze bonding a refractory metal from group IV, V, and VI of the periodic table and alloys thereof containing said metal as a predominating alloying ingredient, to itself or to some other difficultly wettable material the improvement which comprises the steps of disposing selected surfaces of said parts to be brazed together in abutting relationship with a brazing alloy disposed adjacent said abutting surfaces, said brazing alloy consisting essentially of, by weight, 40–50 percent zirconium, 40–50 percent titanium, and the balance beryllium in amounts ranging from 1–20 percent; in an inert atmosphere, heating said alloy to braze said parts together and thereafter cooling the resultant brazed joint.

4. The method according to claim 3, wherein the brazing alloy consists essentially, by weight, 40–50 percent zirconium, 40–50 percent titanium, and the balance beryllium in amounts ranging from 1–10 percent.

References Cited in the file of this patent
FOREIGN PATENTS
782,564    Great Britain _____ Sept. 11, 1957